UNITED STATES PATENT OFFICE.

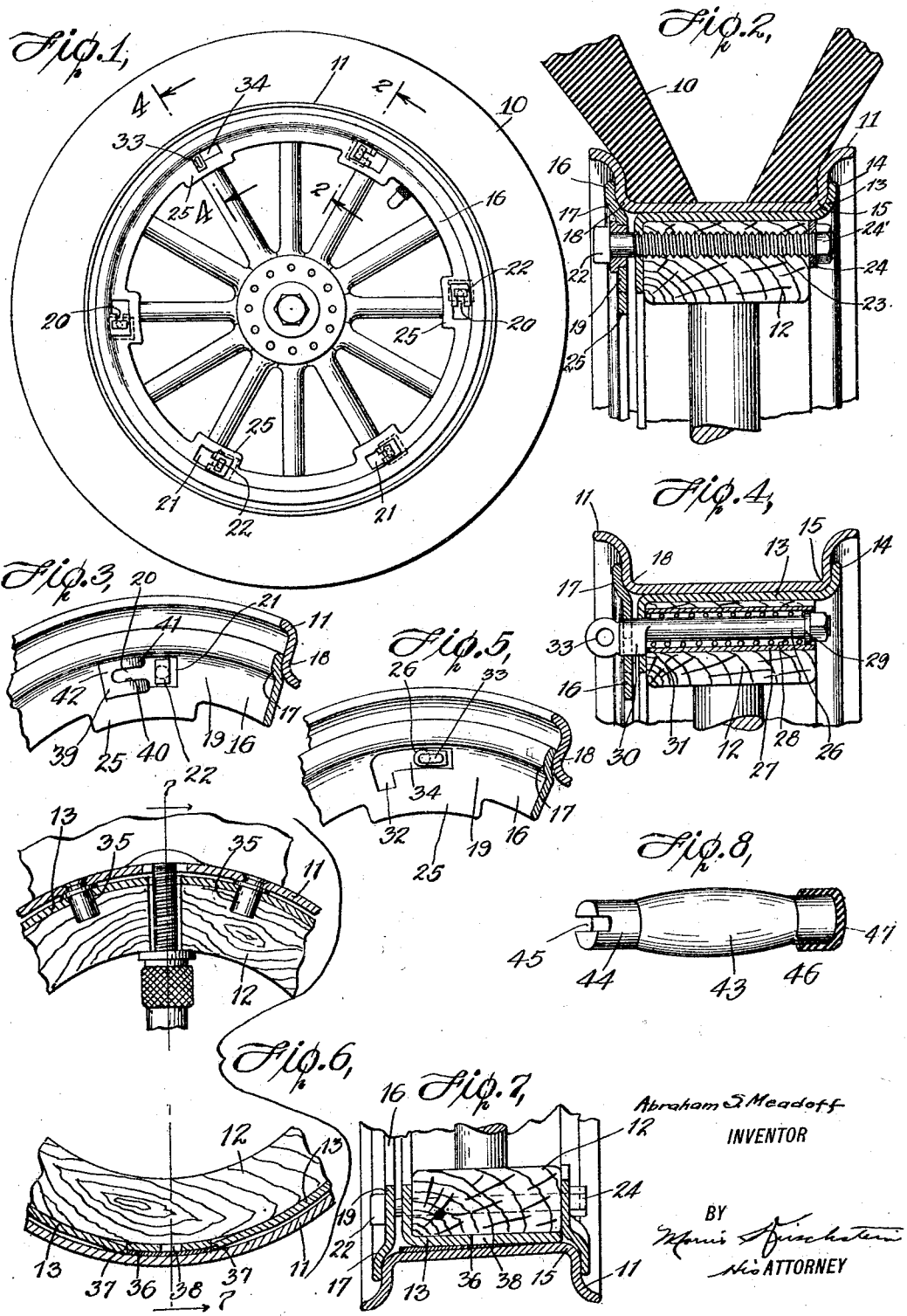

ABRAHAM S. MEADOFF, OF NEW YORK, N. Y.

ATTACHMENT FOR AUTOMOBILE WHEELS.

1,410,208.   Specification of Letters Patent.   Patented Mar. 21, 1922.

Application filed January 25, 1918. Serial No. 213,649.

*To all whom it may concern:*

Be it known that ABRAHAM S. MEADOFF, a citizen of the United States, and resident of 188 St. Nicholas Avenue, in the city and county of New York and State of New York, has invented certain new and useful Improvements in Attachments for Automobile Wheels, of which the following is a specification.

My invention relates to improvements in means for readily removing the tire and tire rim of automobile and the like tire-bearing wheels.

Among the objects of this invention are the following: to provide an attachment for automobile wheels of the character and purpose described herein and in my prior application which shall be readily adaptable for use with an automobile wheel, the felly of which is provided with the usual metal band curved to receive the lower curved shoulder of the demountable rim; to provide suitable means for preventing relative motion between the metal band of the felly or the felly itself and the demountable rim; to provide improved locking means for locking the plate which is an embodiment of this invention to the wheel, which means shall be simple in construction, more efficient, easy and quick in its operation, and inexpensive to make; and to provide an embodiment of the invention described in my prior application which shall be cheaper and simpler in construction, and more efficient and effective in its operation, and better adaptable in practice for the purposes set forth herein and in my prior application.

Other objects and advantages of this invention will appear from the detailed description and the features of novelty will be particularly pointed out in the claims.

Certain features herein shown and described are shown, described and claimed in my co-pending application, Serial No. 274,587, filed in the United States Patent Office February 1st, 1919, and accordingly are not claimed herein.

With the above exception, the invention accordingly consists in the features of construction, combinations of elements and arrangement of parts which will be exemplified in the apparatus hereinafter described and the scope of the application of which will be indicated in the following claims.

In the drawing,

Fig. 1 is a vertical elevation of an automobile wheel provided with an embodiment of this invention, Fig. 2 is an enlarged detailed section along line 2—2 of Fig. 1, Fig. 3 is a fragmental face view showing the plate in contact with the demountable rim and showing the means for preventing the contact surfaces of the plate and bolts from becoming rusted, Fig. 4 is an enlarged detailed section taken along line 4—4 of Fig. 1 and shows the improved locking means for positively holding the plate in position, Fig. 5 is a fragmental face view similar to Fig. 3 showing the locking means, Fig. 6 is a broken away vertical section showing particularly the upper and lower portions of the wheel and the means for preventing relative motion between the felly and the demountable rim, Fig. 7 is a detailed sectional view taken along line 7—7 of Fig. 6, Fig. 8 is a perspective view of one form of tool specially adapted for the manipulation of the plate.

Referring in detail to the drawing, 10 indicates the automobile tire and 11 the demountable rim. The felly 12 on the wheel is provided with the usual metal band 13 curved to receive the lower, curved as at 14, portion 15 of the demountable rim. The continuous plate 16 is for the most part similar in construction to the plate (designated by 13 in my prior application) referred to herein. However, the following differences are to be noted:

The present plate or ring 16 has its upper portion 17 shaped to accommodate the lower curved portion 18 of the demountable rim and has a lower flat portion 19 adapted to be substantially parallel to the face of the felly. This upper portion 17 and the lower portion 18 are adapted to frictionally engage along a narrow surface, making substantially a line contact. This construction of the plate to provide the curved portion and flat portion as described is highly advantageous in that when the plate is secured in position as hereinafter described, contact between the demountable rim and the plate is made only along a portion of the latter, and because of the correspondence in contour, it is possible to make a tight holding fit without having all of the curved surface of the plate contact with the demountable rim. In the drawing, it will be noted that the contact between the curved portion of the plate and the shoulder of the demountable rim is partial, in fact, I have found in experimenting with my device and trying it out on an actual automobile wheel of an automobile in use that when the flanged plate is removed, a thin circular line is marked out thereon where it has been in contact with the demountable rim. This line I have found to be situated at the point where the lower portion of the rim bends to form the shoulder. The contact between the plate and the rim thus takes place at the point of greatest strength and at the same time only along this circular line. In this way, that is by forming the flanged plate as described, I accomplish a strong tight hold between the rim and the plate and yet the latter contacts with the rim only along a line of its surface thus preventing the metal plate from sticking to the rim due to oxidation or rust. The means of attaching and removing the plate 16 consists in the spaced slots 20 cut in the plate, these slots terminating in an enlarged opening 21 larger than the head 22 of the threaded bolts 23 whereby the plate is positively held against the demountable rim. It will be understood that these bolts 23 pass through holes provided in the plate, the metal band, the felly and holding plate or washer 24 for the nut 24'. It will be clear that when the bolts lie in the extreme narrow end of the slots 20, the plate is positively held on the wheel and against the curved shoulder of the demountable rim along a continuous surface of contact provided by the curved portion 17 of the frame. Between this portion 17 and the curved portion 14 on the metal band, the rim and tire are positively held on the felly. It will be noted that the plate 16 is held against the demountable rim to provide continuous frictional engagement therewith and yet its flat portion 19 is spaced from the felly itself and not in contact therewith. The slotted portions of the plate are widened as at 25 to give additional strength. To make the demountable rim loose on the felly it is simply necessary to give the plate 16 a partial rotation so that the plate moves relative to the bolts until the latter lie in the enlarged openings 21 on the slot. If the locking means hereinafter described is unlocked, the plate may now be readily removed and the demountable rim and tire easily taken off and replaced.

The locking means referred to above is provided for the purpose of preventing the plate from slipping when the wheel is in motion. This means consists of a bolt 26 held in a sleeve 27, (preferably of brass to prevent rust), which passes through the felly. The bolt 26 is normally held in by the spring 28 held between the washer 29 and the front wall of the metal band. The bolt has an enlarged shank portion 30 which provides a front shoulder 31 in contact with the felly when the bolt is held in and turned as in Fig. 4 in locking position. In this position the head of the bolt rests in the enlarged opening 32 in the plate. In unlocking the plate the head 33 is pulled out until the shoulder 31 is beyond the front face of the plate 16. The bolt is then turned so that the shank takes a position at right angles to that shown in Fig. 4. When the partial rotation is given to the plate the slot 34 permits relative motion between the bolt and the plate, and the latter may be removed. The locking means thus operate to help hold the plate in position, prevent rotation thereof and cooperate with the holding means when the plate is to be removed.

The means for preventing relative motion between the metal band and the demountable rim are shown clearly in Fig. 6. These means consist simply in dowel pins 35 passing through perforations in the demountable rim, metal band, and felly on the upper part of the wheel. On the lower part of the wheel the metal wedge 36 is welded on to the demountable rim, and the shoulders 37 formed in the metal band enable the tapered metal piece 36 to wedge in between the metal band and the demountable rim. The perforation 38 is made in the portion of the metal band disposed over the wedge so that grease may be applied to prevent rust.

Fig. 3 shows one means for preventing the contact surfaces of the plate and heads of the bolts from rusting. This consists of a piece 39 of non-rusting metal (preferably brass) secured in any suitable manner to the face of the plate 16 and disposed over the slotted portion 20 thereof. This piece 39 is cut away to provide the slot 40 and the walls 41 on the slot which taper as indicated by the shading to vary in thickness from a maximum at 42.

Fig. 8 shows a form of tool adaptable for manipulating the plate 16. It consists simply of a bar 43 having at one end thereof a metal portion 44 cut away as at 45. A metal sleeve 46 is provided at the other end and a rubber cap 47 mounted thereon. To give the plate the desired partial rotation, the tool is simply applied to the plate and lightly tapped or hammered.

Having thus described my invention, I claim as new and desire to secure by Letters Patent:

1. In combination with a demountable tire rim for automobile wheels, a plate member adapted to be mounted on one face of the wheel, said plate being formed with an upper curved portion conforming to the contour of the lower side of the tire rim and having spaced slots in the face thereof, means passing through said slots and the felly of the wheel to removably hold said curved portion of the plate in continuous frictional engagement with the demountable rim, at the point of bend of the shoulder of the demountable rim and a slotted bevelled piece of non-rusting material secured to said ring and arranged to cooperate with said ring holding means for preventing said ring and said holding means from rusting together.

2. In combination with a demountable tire rim for automobile wheels, a plate adapted to removably hold said tire rim on the wheel, said plate having spaced slots in the face thereof, means passing through said slots for holding the plate in continuous frictional contact with said demountable rim, at the point of bend of the shoulder of the demountable rim, said slots being enlarged at one end, said plate being rotatable until said holding means lie loosely in said enlarged openings, whereby the plate is made loose on the wheel, and means for locking said ring against movement relatively to said wheel comprising a bolt, an enlarged shank portion on said bolt for engaging said ring and said wheel, and a spring for normally maintaining said shank portion in engagement with said rim and said wheel.

3. An automobile wheel comprising a felly, a metal band on said felly, a demountable rim on said metal band, the latter having a curved portion shaped to conform to the contour of one lower curved shoulder of said demountable rim, a plate mounted on the face of the wheel opposite said curved portion of the metal band, said plate having a corresponding similarly shaped curved portion to receive the other shoulder to the demountable rim, a pair of shoulders extending across the cylindrical face of said band struck outwardly from said band, a wedge member secured to the inner cylindrical surface of said demountable rim, extending across said inner surface and arranged to fit between said band shoulders, and means for forcing said demountable rim against the curved portion of said band for causing said wedge to lock said band and said rim together against relative rotation.

4. An automobile wheel comprising a felly, a metal band on said felly, a demountable rim on said metal band, the latter having a curved portion shaped to conform to the contour of one lower curved shoulder of said demountable rim, a plate mounted on the face of the wheel opposite said curved portion of the metal band, said plate having a corresponding similarly shaped curved portion to receive the other shoulder of the demountable rim, said plate, metal band and felly having perforations formed therein to be in registry with each other, and means passing through said perforations for locking said plate from rotation, said means comprising a sleeve of non-rusting material in the perforation in the felly, a spring member in said sleeve, a bolt passing through said perforations and having an enlarged shank portion, said spring adapted to hold the bolt in with the shank portion in abutting contact with the felly of the wheel, said bolt adapted to be pulled out and turned so as to lie loosely in the opening in the plate.

5. The circular plate having a flat portion and an upper curved portion integral therewith, spaced slots in the flat portion thereof terminating in enlarged openings, and tapered cut away pieces of non-rusting material disposed over said slots, as and for the purpose described and specified.

6. In an automobile wheel, a demountable rim, a wheel rim, a pair of shoulders extending across said wheel rim formed by striking portions of said wheel rim outwardly from said wheel rim, a wedge member secured to the inner cylindrical surface of said demountable rim and arranged to fit between said band shoulders, and means for forcing said demountable rim across said wheel rim for causing said wedge to lock said rims together against relative movement.

Signed at New York city, in the county of New York and State of New York, this 17 day of January, A. D. 1918.

ABRAHAM S. MEADOFF.

Witnesses:
GEORGE JAMES RUSSELL,
CHARLES E. WARD.